United States Patent

Schwerzel et al.

[11] Patent Number: 5,130,350
[45] Date of Patent: Jul. 14, 1992

[54] ELECTROCOATING BINDERS WHICH ARE WATER-DILUTABLE ON PROTONATION WITH AN ACID, FOR THE PRODUCTION OF THICK COATING FILMS, BASED ON MONOFUNCTIONALLY INITIATED EPOXY RESINS

[75] Inventors: Thomas Schwerzel, Ludwigshafen; Hans Schupp, Worms; Dirk Lawrenz, Ditzingen; Hans Oslowski; Ulrich Heimann, both of Muenster, all of Fed. Rep. of Germany

[73] Assignee: BASF Lacke & Farben Aktiengesellschaft, Fed. Rep. of Germany

[21] Appl. No.: 681,265

[22] Filed: Apr. 8, 1991

Related U.S. Application Data

[62] Division of Ser. No. 382,915, Jul. 21, 1989, Pat. No. 5,039,721.

[30] Foreign Application Priority Data

Jul. 28, 1988 [DE] Fed. Rep. of Germany ....... 3825562

[51] Int. Cl.$^5$ .................... C08G 59/42; C08G 59/62; C08L 63/00
[52] U.S. Cl. .................... 523/417; 523/415; 523/416; 528/88; 528/104; 528/110; 528/341; 525/481; 525/510
[58] Field of Search .............. 523/417, 415, 416; 528/88, 104, 110, 341

[56] References Cited

U.S. PATENT DOCUMENTS

| | | | |
|---|---|---|---|
| 4,134,866 | 1/1979 | Tominage et al. | 523/415 |
| 4,661,541 | 4/1987 | Batzill et al. | 528/110 |
| 4,780,524 | 10/1988 | Dobblestein et al. | 528/104 |
| 4,824,927 | 4/1989 | Dobblestein et al. | 528/110 |

Primary Examiner—John C. Bleutge
Assistant Examiner—Frederick Krass
Attorney, Agent, or Firm—Keil & Weinkauf

[57] ABSTRACT

Cathodic electrocoating binders which are water-dilutable on protonation with an acid are obtainable by reacting A) an epoxy compound or a mixture of epoxy compounds having an epoxide equivalent weight of less than 2,000 with B) a compound which is monofunctional with respect to epoxides and contains aliphatic or phenolic OH groups and C) a secondary amine of 2 to 36 carbon atoms, with the proviso that the reaction product of A), B) and C) still contains free epoxy groups, and D) an amount of an amidoamine containing primary amino groups which is equivalent to or greater than the amount of these free epoxy groups, the said amidoamine being obtainable from a primary diamine and a mono- and/or dicarboxylic acid.

2 Claims, No Drawings

ELECTROCOATING BINDERS WHICH ARE WATER-DILUTABLE ON PROTONATION WITH AN ACID, FOR THE PRODUCTION OF THICK COATING FILMS, BASED ON MONOFUNCTIONALLY INITIATED EPOXY RESINS

This is a divisional application of Ser. No. 07/382,915, filed Jul. 21, 1989 now U.S. Pat. No. 5,039,721.

The present invention relates to electrocoating binders which are water-dilutable on protonation with an acid and are based on an amidoamine-modified epoxy resin, for the production of thick coating films.

In automotive coating, a three-coat system consisting of a cathodic electrocoating primer, a filler coat and a top coat is currently applied. The film thicknesses of the coatings which can be obtained with normal films of cathodic electrocoating finishes are about 20 µm. With film thicknesses greater than 30 µm, the filler coat could be dispensed with, substantially simplifying the coating process.

DE-A 35 18 732 describes water-dilutable cathodic electrocoating binders based on epoxy resins having ammonium, sulfonium and/or phosphonium groups, but these binders only give coatings having film thicknesses of from 20 to 29 µm.

DE-A 35 18 770 likewise describes water-dilutable binders based on modified epoxy resins for cathodic electrocoating. With these binders, it is possible to achieve film thicknesses of from 18 to 23 µm.

It is an object of the present invention to provide novel cathodic electrocoating binders which make it possible to produce thick coating films.

We have found that this object is achieved by cathodic electrocoating binders which are water-dilutable on protonation with an acid and are obtainable by reacting A) an epoxy compound or a mixture of epoxy compounds having an epoxide equivalent weight of less than 2,000 with B) a compound which is monofunctional with respect to epoxides and contains aliphatic or phenolic OH groups and C) a secondary amine of 2 to 36 carbon atoms, with the proviso that the reaction product of A), B) and C) still contains free epoxy groups, and D) an amount of an amidoamine containing primary amino groups which is equivalent to or greater than the amount of these free epoxy groups, the said amidoamine being obtainable from a primary diamine and a mono- and/or dicarboxylic acid.

Regarding the components, the following may be stated.

Epoxy resins which have a mean molecular weight $M_n$ of from 300 to 2,000 and on average contain from 1.5 to 3.0 epoxy groups per molecule, preferably compounds having 2 epoxy groups per molecule, can be used as component A). Epoxy resins having mean molecular weights of from 350 to 1,000, in particular from 350 to 550, are preferred. Particularly preferred epoxy resins are glycidyl ethers of polyphenols which contain on average two or more phenolic hydroxyl groups in the molecule and can be prepared in a conventional manner by etherification with an epihalohydrin in the presence of an alkali. Examples of suitable phenol compounds are 2,2-bis-(4-hydroxyphenyl)-propane (bisphenol A), 4,4'-dihydroxybenzophenone, 1,1-bis-(4-hydroxyphenyl)-ethane, 1,1-bis-(4-hydroxyphenyl)-isobutane, 2,2-bis-(4-hydroxy-tert-butylphenol)-propane, bis-(4-hydroxynaphthyl)-methane and 1,5-dihydroxynaphthalene.

Another suitable class of epoxy resins are polyglycidyl ethers of phenolic novolak resins, by means of which the functionality can be increased from 2 to about 6 glycidyl groups per molecule, the said compounds being of the formula

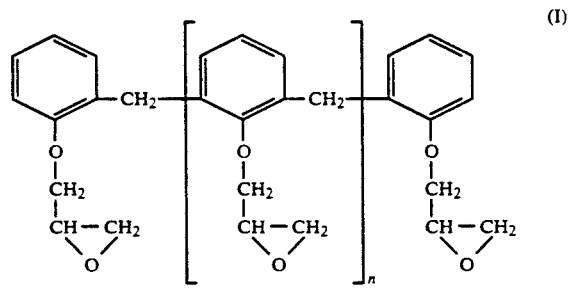

where n is from 0 to 6.

Other suitable epoxy resins are those of the formula

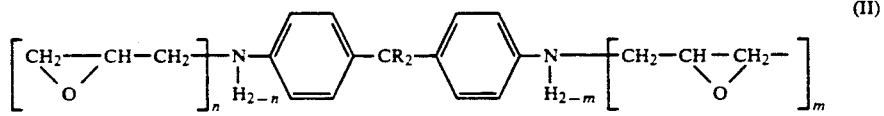

where n is 1 or 2, m is 1 or 2 and R is H or $C_1$–$C_{18}$-alkyl.

Polyglycidyl ethers of polyhydric alcohols, such as those of ethylene glycol, diethylene glycol, triethylene glycol, 1,2-propylene glycol, propane-1,3-diol, pentane-1,5-diol, hexane-1,2,6-triol, glycerol and 2,2-bis-(4-hydroxycyclohexyl)-propane, are also suitable. It is also possible to use polyglycidyl esters of polycarboxylic acids. Oxalic acid, succinic acid, glutaric acid, terephthalic acid, 2,6-naphthalenedicarboxylic acid and dimerized linolenic acid are preferred. Typical examples are glycidyl adipate and glycidyl phthalate.

Compounds which are monofunctional with respect to epoxides under the reaction conditions and contain aliphatic or phenolic OH groups can be used as component B). Suitable compounds containing aliphatic OH groups are $C_1$–$C_{20}$-alcohols, for example linear or branched alcohols, such as butanol, hexanol or 2-ethylhexanol, etherols, such as butylglycol, hexylglycol, methoxypropanol or phenoxypropanol, and polyetherols which are obtainable by reacting alcohols or phenols with, for example, ethylene oxide or propylene oxide or mixtures of these.

Examples of suitable compounds containing phenolic OH groups are phenol or phenols which are substituted in the nucleus and contain alkyl or alkoxy radicals of from 1 to 20 carbon atoms. Examples are tert-butylphenol, nonylphenol, dodecylphenol, anisole, ethoxyphenol, propoxyphenol and butoxyphenol. Nonylphenol and dodecylphenol are preferred.

Suitable components C) are secondary amines of 2 to 36 carbon atoms, such as dimethylamine, diethylamine and dibutylamine, and alkylalkanolamines, such as methylethanolamine, ethylethanolamine and methylisopropanolamine, and dialkanolamines, such as diethanolamine and diisopropanolamine. The secondary monoamines may also contain further functional groups, provided that they do not interfere with the reaction of the secondary amines with the polyepoxides. The stated secondary monoamines can be used alone or as a mixture. Alkanolamines which carry one or two hydroxyl functions, e.g. methylethanolamine or diethanolamine, are preferably used.

Suitable components D) are primary amino-containing amidoamines, which can be prepared by subjecting a primary diamine to a condensation reaction with a mono- and/or dicarboxylic acid. Examples of suitable diprimary diamines are ethylenediamine, 1,3-diaminopropane, 1,4-diaminobutane, 1,6-diaminohexane, 4,9-dioxadodecane-1,12-diamine, 4,7-dioxadodecane-1,10-diamine, 4,4-diaminodicyclohexylmethane, 9-aminomethylstearylamine, 2-(3-aminopropyl)-cyclohexylamine and branched diamines, e.g. 2-methylpentanediamine and 2-ethylbutanediamine. Aromatic diamines, e.g. 4,4'-diaminodiphenylmethane, 4,4'-diaminodiphenyl ether, 4,4'-diaminodiphenyl sulfone and toluylenediamine, and compounds having benzylic amine functions, e.g. xylylenediamine, are also suitable. Suitable monocarboxylic acids are $C_{12}$-$C_{18}$-fatty acid, for example oleic acid, linoleic acid or linolenic acid, and linseed oil fatty acid, which contains a mixture of these fatty acids. Examples of suitable dicarboxylic acids are dimerized or oligomerized unsaturated $C_{14}$-$C_{22}$-fatty acids, as commercially available, for example, under the name Pripol ® from Unichema. Although monocarboxylic acids can also be used alone, it is generally advantageous if dicarboxylic acids are also present. Conversely, dicarboxylic acids may be used alone, which in many cases leads to excellent binders; however, it is often advantageous concomitantly to use minor amounts of monocarboxylic acids.

In order for the carboxamidoamine to contain residual free primary amino groups, it is necessary to employ a sufficient excess of diprimary amine. In general, a 1.5-10, preferably 2-6, molar excess of diprimary diamine is used, and this excess can, if required, be distilled off after the condensation reaction.

The reaction of the diamines with the carboxylic acids is carried out in general at from 100° to 250° C., preferably from 150° to 200° C. To facilitate removal of the water formed during the condensation, a solvent which is a suitable entraining agent, for example toluene or xylene, may be added. The carboxylic acids may also be used in the form of their esters. In this case, alcohol is eliminated, instead of water, in the condensation. Instead of fatty acids, it is therefore also possible to use fats, i.e. the glycerol esters of the fatty acids. For the preparation of component D), the primary diamines and the carboxylic acids are used in amounts such that the ratio of the number of equivalents of $NH_2$ to that of COOH is about 2:1-10:1, preferably 2.5:1-5:1. The presence of larger or smaller amounts, depending on the ratio of equivalents employed, of free diamine in the product does not present problems and may even be desirable in many cases.

To prevent multiple reaction of the primary amino groups with the epoxy groups of the reaction product of A), B) and C), it is advantageous to protect the primary amino group by conversion to a ketimine group with a carbonyl compound and to react it in this form with the epoxy resin. Ketimines of this type can be readily obtained from ketones and primary diamines with removal of the resulting water, for example by azeotropic distillation.

Particularly suitable ketones are those which, apart from the keto group, do not contain any further group which is reactive toward a primary amino group. Examples of suitable ketones are acetone, methyl ethyl ketone, methyl propyl ketone, methyl isopropyl ketone, methyl isobutyl ketone, methyl isoamyl ketone, diethyl ketone, dipropyl ketone and cyclohexanone. Acetone, methyl ethyl ketone and methyl isobutyl ketone are particularly preferred.

Diprimary diamines may be present as component E). Examples of suitable diprimary diamines are ethylenediamine, 1,3-diaminopropane, 1,4-diaminobutane, 1,6-diaminohexane, 4,9-dioxadodecane-1,12-diamine, 4,4-diaminodicyclohexylmethane, 9-aminomethylstearylamine, 2-(3-aminopropyl)-cyclohexylamine and branched diamines, e.g. 2-methylpentanediamine and 2-ethylbutanediamine. Diamines containing ether groups, e.g. 4,9-dioxadodecane-1,12-diamine and 4,7,10-trioxatridecane-1,13-diamine, may also be present. The diprimary diamines may also contain further secondary or tertiary amino groups, e.g. diethylenetriamine, dipropylenetriamine, 3-(2-aminoethyl)-aminopropylamine, triethylenetetramine, N,N'-bis-(3-aminopropyl)-ethylenediamine and bis-(2-aminoethyl)-methylamine.

In the case of component E) too, the amino groups can be converted into ketimine groups, as for component D).

When component E) is present, it is used in an amount such that not less than an equivalent amount, based on the free epoxy groups of the reaction product of A), B) and C), of the amino groups of components D) and E) is present.

Components A) to E) are reacted with one another in the following ratios of equivalents:

From 0.05 to 0.9, preferably from 0.1 to 0.75, OH equivalent of component B) is used per epoxide equivalent of component A). In the case of component A) whose epoxide equivalent weight is greater than 300, from 0.1 to 0.3 OH equivalent is particularly preferred. For specific compounds as component A), specific ratios of equivalents have proven suitable. Thus, from 0.1 to 0.5 OH equivalent is preferred for bisphenol A diglycidyl ether, from 0.4 to 0.8 OH equivalent for epoxidized novolaks and from 0.4 to 0.6 OH equivalent for epoxy resins of the formula (II). From 0.1 to 0.85, preferably from 0.3 to 0.6, mole of the secondary amine C) is used per epoxide equivalent of the reaction product of components A) and B).

From 1.01 to 1.8, preferably from 1.01 to 1.4, equivalents of component C), based on a primary amino group, are used per epoxide equivalent of the reaction product of A), B) and C). When component E) is present, the sum of the number of equivalents of D) and E) is used as a basis.

The reaction of component A) with component B) is carried out at from 100° to 190° C., in the presence or absence of a catalyst, such as potassium tert-butylate, boron trifluoride etherate, diazabicyclo[2.2.2]octane, dimethylbenzylamine or diazabicycloundecane. The reaction product of A) and B) has terminal epoxy groups and a mean molecular weight of from 600 to 5,000.

The reaction of this reaction product with component C) can be carried out at room temperature, but it is advantageous to select a higher temperature of up to about 120° C., preferably up to about 90° C., in order to accelerate the reaction. A reaction time of 2 hours at from 70° to 90° C. is generally sufficient. These conditions also apply to the further reactions of the reaction product of A), B) and C) with D) and, where relevant, E). Only ketimine groups require a higher reaction temperature of from 80° to 150° C., preferably from 110° to 130° C.

The amine numbers of the novel binders are from 40 to 180 mg of KOH per g.

The mean molecular weights $\overline{M}_n$ of the novel binders are about 500–10,000, preferably 800–3,000.

The viscosities of the novel binders are from 200 to >4,000 mPa.s at 75° C. (plate-and-cone viscometer). The K values are from 15 to 35.

When the binders are dispersed in water, epoxide/ketimine adducts hydrolyze to give secondary amino groups. After treatment with water, the novel binders contain hydroxyl groups, secondary amino groups and also primary and/or tertiary amino groups. They are therefore capable of undergoing a large number of crosslinking reactions, which makes them useful coating binders after suitable crosslinking agents have been mixed with them.

Suitable crosslinking agents for the novel binders are, for example, blocked isocyanates, phenolic Mannich bases, urea condensates, crosslinking agents which cure via ester aminolysis and/or transesterification and other types of crosslinking agents familiar to the skilled worker.

It is not absolutely essential to add separate crosslinking agents since crosslinking functions can also be completely or partially incorporated into the novel binder, so that it is completely or partially self-crosslinking. This can be done, for example, by reacting the binder, after its preparation, with a partially blocked isocyanate which still contains on average one free isocyanate group per molecule. All compounds known to the skilled worker, preferably alcohols, amines and oximes, can be used as blocking agents.

Another possible method of preparing partially or completely self-crosslinking novel binders consists in incomplete reaction with crosslinking components at elevated temperatures. This partial condensation of the crosslinking agent and the binder can be carried out, for example, using phenolic Mannich bases and blocked isocyanate crosslinking agents.

In addition to crosslinking agents, other substances, such as pigments, coating assistants, solvents and curing catalysts, may be added. The coating materials thus prepared can also be applied by a conventional method to substrates such as wood, plastic and metal. For electrocoating, the novel binder, in combination with crosslinking agents and the stated additives, is converted into a water-soluble form by protonation with an acid. Preferably used acids are carboxylic acids, such as formic acid, acetic acid or lactic acid, but inorganic acids, e.g. phosphoric acid, can also be used.

For cathodic electrocoating, the solids content of the electrocoating bath is generally brought to 5–30% by weight. Deposition is usually effected at from 15° to 40° C. for from 0.5 to 5 minutes and at a pH of from 4.0 to 8.5, preferably from 5.0 to 8.0, in general at deposition voltages of from 50 to 500 volt. The electrically conductive article to be coated is made the cathode. The deposited film is cured at above 120° C. for about 20 minutes.

EXAMPLES

Preparation of the Amidoamines or of the Ketiminized Amidoamines

Components (D) and (E)

Amidoamine 1:

580 g of hexamethylenediamine, 290 g of a dimeric fatty acid (Pripol® 1014 from Unichema), 140 g of linseed oil fatty acid (Nouracid LE 80 from Akzo) and 64 g of xylene were heated to 190° C., and 90 g of a mixture of water of reaction and xylene were distilled off azeotropically. The residue was diluted with 109 g of xylene. A further 36 g of hexamethylenediamine were then added. The amine number of the product was 433 mg of KOH/g and the acid number was 3.0 mg of KOH/g.

Amidoamine 2:

290 g of hexamethylenediamine, 218 g of a dimeric fatty acid (Pripol 1014 from Unichema), 70 g of linseed oil fatty acid (Nouracid LE 80 from Akzo) and 31 g of xylene were heated to 190° C., and 48 g of a mixture of water of reaction and xylene were distilled off azeotropically. The residue was diluted with 92 g of xylene. A further 7 g of hexamethylenediamine were then added. The amine number of the product was 350 mg of KOH/g and the acid number was 1.8 mg of KOH/g.

Amidoamine 3:

290 g of hexamethylenediamine, 290 g of a dimeric fatty acid (Pripol 1014 from Unichema), 70 g of linseed oil fatty acid (Nouracid LE 80 from Akzo) and 34 g of xylene were heated to 190° C., and 54 g of a mixture of water of reaction and xylene were distilled off azeotropically. The residue was diluted with 70 g of xylene. A further 7.5 g of hexamethylenediamine were then added. The amine number of the product was 301 mg of KOH/g and the acid number was 1.7 mg of KOH/g.

Amidoamine 4:

246 g of hexamethylenediamine, 307 g of a dimeric fatty acid (Pripol 1014 from Unichema), 59 g of linseed oil fatty acid (Nouracid LE 80 from Akzo) and 39 g of xylene were heated to 190° C., and 57 g of a mixture of water of reaction and xylene were distilled off azeotropically. The residue was diluted with 66 g of xylene. A further 4.1 g of hexamethylenediamine were then added. The amine number of the product was 249 mg of KOH/g and the acid number was 1.6 mg of KOH/g.

Amidoamine 5:

290 g of hexamethylenediamine, 435 g of a dimeric fatty acid (Pripol 1014 from Unichema), 70 g of linseed oil fatty acid (Nouracid LE 80 from Akzo) and 42 g of xylene were heated to 190° C., and 78 g of a mixture of water of reaction and xylene were distilled off azeotropically. The residue was diluted with 85 g of xylene. A further 8.1 g of hexamethylenediamine were then added. The amine number of the product was 219 mg of KOH/g and the acid number was 1.9 mg of KOH/g.

Amidoamine 6:

258 g of diethylenetriamine, 145 g of a dimeric fatty acid (Pripol 1014 from Unichema), 70 g of linseed oil fatty acid (Nouracid LE 80 from Akzo) and 25 g of xylene were heated to 190° C., and 44 g of a mixture of water of reaction and xylene were distilled off azeotropically. The residue was diluted with 51 g of xylene. A further 8.4 g of diethylenetriamine were then added.

The amine number of the product was 738 mg of KOH/g and the acid number was 2.3 mg of KOH/g.

Amidoamine 7 (amidoamine ketimine):

500 g of amidoamine 4 were heated together with 437 g of methyl isobutyl ketone. 38 g of water were distilled off azeotropically in the course of 10 hours. The product had an amine number of 133 mg of KOH/g.

Binders

Binder 1:

960 g of Epikote ® 1001 (polyglycidyl ether based on bisphenol A and containing a bisphenol A diglycidyl ether having an epoxide equivalent weight of about 480, from Shell), 110 g of nonylphenol and 56 g of phenoxypropanol were heated to 130° C. while stirring. 1.1 g of dimethylbenzylamine were added and the reaction was allowed to continue until the epoxide equivalent weight was 1,036. The mixture was diluted with 403 g of a solvent mixture of isobutanol and butylglycol (weight ratio 9:1) and was cooled to 60° C. 30 g of methylethanolamine were added dropwise and the reaction was allowed to continue for a further 10 minutes. Thereafter, 81.6 g of amidoamine 1 and 36.2 g of a 9:1 isobutanol/butylglycol mixture were added. The temperature was kept at 80° C. for a further 2 hours. The solids content was 69.8% by weight and the amine number was 52 mg of KOH/g.

Binder 2:

960 g of Epikote 1001, 110 g of nonylphenol and 56 g of phenoxypropanol were heated to 130° C. while stirring. 1.1 g of dimethylbenzylamine were added and the reaction was allowed to continue until the epoxide equivalent weight was 1,040. The mixture was diluted with 403 g of a solvent mixture of isobutanol and butylglycol (weight ratio 9:1) and was cooled to 60° C. 30 g of methylethanolamine were added dropwise and the reaction was allowed to continue for a further 10 minutes. Thereafter, 98.2 g of amidoamine 2 and 41 g of a 9:1 isobutanol/butylglycol mixture were added. The temperature was kept at 80° C. for a further 2 hours. The solids content was 70.1% by weight and the amine number was 50.8 mg of KOH/g.

Binder 3:

960 g of Epikote 1001, 110 g of nonylphenol and 56 g of phenoxypropanol were heated to 130° C. while stirring. 1.1 g of dimethylbenzylamine were added and the reaction was allowed to continue until the epoxide equivalent weight was 1,058. The mixture was diluted with 403 g of a solvent mixture of isobutanol and butylglycol (weight ratio 9:1) and was cooled to 60° C. 30 g of methylethanolamine were added dropwise and the reaction was allowed to continue for a further 10 minutes. Thereafter, 117.4 g of amidoamine 3 and 47 g of a 9:1 isobutanol/butylglycol mixture were added. The temperature was kept at 80° C. for a further 2 hours. The solids content was 71.6% by weight and the amine number was 49.5 mg of KOH/g.

Binder 4:

960 g of Epikote 1001, 110 g of nonylphenol and 56 g of phenoxypropanol were heated to 130° C. while stirring. 1.1 g of dimethylbenzylamine were added and the reaction was allowed to continue until the epoxide equivalent weight was 1,092. The mixture was diluted with 403 g of a solvent mixture of isobutanol and butylglycol (weight ratio 9:1) and was cooled to 60° C. 30 g of methylethanolamine were added dropwise and the reaction was allowed to continue for a further 10 minutes. Thereafter, 142.1 g of amidoamine 4 and 54 g of a 9:1 isobutanol/butylglycol mixture were added. The temperature was kept at 80° C. for a further 2 hours. The solids content was 70.0% by weight and the amine number was 47.7 mg of KOH/g.

Binder 5:

960 g of Epikote 1001, 110 g of nonylphenol and 56 g of phenoxypropanol were heated to 130° C. while stirring. 1.1 g of dimethylbenzylamine were added and the reaction was allowed to continue until the epoxide equivalent weight was 1,080. The mixture was diluted with 403 g of a solvent mixture of isobutanol and butylglycol (weight ratio 9:1) and was cooled to 60° C. 30 g of methylethanolamine were added dropwise and the reaction was allowed to continue for a further 10 minutes. Thereafter, 161.4 g of amidoamine 5 and 60 g of a 9:1 isobutanol/butylglycol mixture were added. The temperature was kept at 80° C. for a further 2 hours. The solids content was 70.1% by weight and the amine number was 46.7 mg of KOH/g.

Binder 6:

960 g of Epikote 1001, 110 g of nonylphenol and 56 g of phenoxypropanol were heated to 130° C. while stirring. 1.1 g of dimethylbenzylamine were added and the reaction was allowed to continue until the epoxide equivalent weight was 1,002. The mixture was diluted with 403 g of a solvent mixture of isobutanol and butylglycol (weight ratio 9:1) and was cooled to 60° C. 32 g of methylethanolamine were added dropwise and the reaction was allowed to continue for a further 10 minutes. Thereafter, 87.3 g of amidoamine 1 and 39 g of a 9:1 isobutanol/butylglycol mixture were added. The temperature was kept at 80° C. for a further 2 hours. The solids content was 69.7% by weight and the amine number was 53.9 mg of KOH/g.

Binder 7:

960 g of Epikote 1001, 110 g of nonylphenol and 56 g of phenoxypropanol were heated to 130° C. while stirring. 1.1 g of dimethylbenzylamine were added and the reaction was allowed to continue until the epoxide equivalent weight was 908. The mixture was diluted with 403 g of a solvent mixture of isobutanol and butylglycol (weight ratio 9:1) and was cooled to 60° C. 36 g of methylethanolamine were added dropwise and the reaction was allowed to continue for a further 10 minutes. Thereafter, 97.0 g of amidoamine 1 and 43 g of a 9:1 isobutanol/butylglycol mixture were added. The temperature was kept at 80° C. for a further 2 hours. The solids content was 70.1% by weight and the amine number was 59.9 mg of KOH/g.

Binder 8:

960 g of Epikote 1001, 110 g of nonylphenol and 56 g of phenoxypropanol were heated to 130° C. while stirring. 1.1 g of dimethylbenzylamine were added and the reaction was allowed to continue until the epoxide equivalent weight was 815. The mixture was diluted with 403 g of a solvent mixture of isobutanol and butylglycol (weight ratio 9:1) and was cooled to 60° C. 40 g of methylethanolamine were added dropwise and the reaction was allowed to continue for a further 10 minutes. Thereafter, 109.4 g of amidoamine 1 and 49 g of a 9:1 isobutanol/butylglycol mixture were added. The temperature was kept at 80° C. for a further 2 hours. The solids content was 69.8% by weight and the amine number was 63.4 mg of KOH/g.

Binder 9:

960 g of Epikote 1001, 110 g of nonylphenol and 56 g of phenoxypropanol were heated to 130° C. while stirring. 1.1 g of dimethylbenzylamine were added and the reaction was allowed to continue until the epoxide equivalent weight was 1,098. The mixture was diluted with 403 g of a solvent mixture of isobutanol and butylglycol (weight ratio 9:1) and was cooled to 60° C. 30 g of methylethanolamine were added dropwise and the reaction was allowed to continue for a further 10 minutes. Thereafter, 71.8 g of amidoamine 6 and 34 g of a 9:1 isobutanol/butylglycol mixture were added. The temperature was kept at 80° C. for a further 2 hours. The solids content was 69.5% by weight and the amine number was 63.5 mg of KOH/g.

Binder 10:

451 g of Araldit ® GY2600 (bisphenol A diglycidyl ether having an epoxide equivalent weight of about 180–190, from Ciba-Geigy), 176 g of nonylphenol and 33 g of phenoxypropanol were heated to 130° C. while stirring. 0.6 g of dimethylbenzylamine was added and the reaction was allowed to continue until the epoxide equivalent weight was 977. The mixture was diluted with 236 g of a solvent mixture of isobutanol and butylglycol (weight ratio 9:1) and was cooled to 60° C. 19 g of methylethanolamine were added dropwise and the reaction was allowed to continue for a further 10 minutes. Thereafter, 52.4 g of amidoamine 1 and 29 g of a 9:1 isobutanol/butylglycol mixture was added. The temperature was kept at 80° C. for a further 2 hours. The solids content was 70.1% by weight and the amine number was 55.1 mg of KOH/g.

Binder 11:

1,504 g of Araldit GY2600, 660 g of nonylphenol and 114 g of phenoxypropanol were heated to 130° C. while stirring. 5.4 g of dimethylbenzylamine were added and the reaction was allowed to continue until the expoxide equivalent weight was 1,022. The mixture was diluted with 813 g of a solvent mixture of isobutanol and butylglycol (weight ratio 9:1) and was cooled to 60° C. 64 g of methylethanolamine were added dropwise and the reaction was allowed to continue for a further 10 minutes. Thereafter, 172.6 g of amidoamine 1 and 77 g of a 9:1 isobutanol/butylglycol mixture were added. The temperature was kept at 80° C. for a further 2 hours. The solids content was 70.6% by weight and the amine number was 51.0 mg of KOH/g.

Binder 12:

940 g of Araldit GY2600, 275 g of nonylphenol and 64 g of phenoxypropanol were heated to 130° C. while stirring. 3.0 g of dimethylbenzylamine were added and the reaction was allowed to continue until the epoxide equivalent weight was 1,112. The mixture was diluted with 457 g of a solvent mixture of isobutanol and butylglycol (weight ratio 9:1) and was cooled to 60° C. 33 g of methylethanolamine were added dropwise and the reaction was allowed to continue for a further 10 minutes. Thereafter, 89.0 g of amidoamine 1 and 40 g of a 9:1 isobutanol/butylglycol mixture were added. The temperature was kept at 80° C. for a further 2 hours. The solids content was 70.7% by weight and the amine number was 49.7 mg of KOH/g.

Binder 13:

440 g of Epikote 155 (polyglycidyl ether of phenolic novolak resins of the formula I, having an epoxide equivalent weight of about 180–190), 220 g of nonylphenol and 35 g of phenoxypropanol were heated to 130° C. while stirring. 0.17 g of triphenylphosphine was added and the reaction was allowed to continue until the epoxide equivalent weight was 445. The mixture was diluted with 248 g of a solvent mixture of isobutanol and butylglycol (weight ratio 9:1) and was cooled to 60° C. 51 g of methylethanolamine were added dropwise and the reaction was allowed to continue for a further 10 minutes. Thereafter, 240.0 g of amidoamine 4 and 90 g of a 9:1 isobutanol/butylglycol mixture were added. The temperature was kept at 80° C. for a further 2 hours. The solids content was 69.7% by weight and the amine number was 105.3 mg of KOH/g.

Binder 14:

414 g of Epikote 155, 297 g of nonylphenol and 37 g of phenoxypropanol were heated to 130° C. while stirring. 0.50 g of triphenylphosphine was added and the reaction was allowed to continue until the epoxide equivalent weight was 723. The mixture was diluted with 267 g of a solvent mixture of isobutanol and butylglycol (weight ratio 9:1) and was cooled to 60° C. 27 g of methylethanolamine were added dropwise and the reaction was allowed to continue for a further 10 minutes. Thereafter, 127.2 g of amidoamine 4 and 48 g of a 9:1 isobutanol/butylglycol mixture were added. The temperature was kept at 80° C. for a further 2 hours. The solids content was 70.9% by weight and the amine number was 61.3 mg of KOH/g.

Binder 15:

248 g cf Epikote MY 720 (polyglycidyl ether of 4,4'-diaminodiphenylalkane of the formula II, having an epoxide equivalent weight of about 180–190), 220 g of nonylphenol and 25 g of phenoxypropanol were heated to 130° C. while stirring. 0.12 g of triphenylphosphine was added and the reaction was allowed to continue until the epoxide equivalent weight was 477. The mixture was diluted with 176 g of a solvent mixture of isobutanol and butylglycol (weight ratio 9:1) and was cooled to 60° C. 30 g of methylethanolamine were added dropwise and the reaction was allowed to continue for a further 10 minutes. Thereafter, 141.3 g of amidoamine 4 and 53 g of a 9:1 isobutanol/butylglycol mixture were added. The temperature was kept at 80° C. for a further 2 hours. The solids content was 68.2% by weight and the amine number was 180.5 mg of KOH/g.

Binder 16:

298 g of Epikote MY 720, 264 g of nonylphenol and 29 g of phenoxypropanol were heated to 130° C. while stirring. 0.14 g of triphenylphosphine was added and the reaction was allowed to continue until the epoxide equivalent weight was 477. 27 g of bisphenol A and 0.15 g of triphenylphosphine were then added and the reaction was allowed to continue until the epoxide equivalent weight was 614. The mixture was diluted with 223 g of a solvent mixture of isobutanol and butylglycol (weight ratio 9:1) and was cooled to 60° C. 29 g of methylethanolamine were added dropwise and the reaction was allowed to continue for a further 10 minutes. Thereafter, 135.5 g of amidoamine 4 and 51 g of a 9:1 isobutanol/butylglycol mixture were added. The temperature was kept at 80° C. for a further 2 hours. The solids content was 69.2% by weight and the amine number was 159.0 mg of KOH/g.

Binder 17:

298 g of Epikote MY 720, 264 g of nonylphenol and 29 g of phenoxypropanol were heated to 130° C. while stirring. 0.14 g of triphenylphosphine was added and the reaction was allowed to continue until the epoxide equivalent weight was 440. 50 g of bisphenol A and 0.15 g of triphenylphosphine were then added and the reaction was allowed to continue until the epoxide equivalent weight was 733. The mixture was diluted with 232 g of a solvent mixture of isobutanol and butylglycol (weight ratio 9:1) and was cooled to 60° C. 23 g of methylethanolamine were added dropwise and the reaction was allowed to continue for a further 10 minutes. Thereafter, 110.5 g of amidoamine 4 and 42 g of a 9:1 isobutanol/butylglycol mixture were added. The temperature was kept at 80° C. for a further 2 hours. The solids content was 69.2% by weight and the amine number was 149.1 mg of KOH/g.

Binder 18:

298 g of Epikote MY 720, 264 g of nonylphenol and 29 g of phenoxypropanol were heated to 130° C. while stirring. 0.14 g of triphenylphosphine was added and the reaction was allowed to continue until the epoxide equivalent weight was 463. 68 g of bisphenol A and 0.15 g of triphenylphosphine were then added and the reaction was allowed to continue until the epoxide equivalent weight was 1,028. The mixture was diluted with 241 g of a solvent mixture of isobutanol and butylglycol (weight ratio 9:1) and was cooled to 60° C. 18 g of methylethanolamine were added dropwise and the reaction was allowed to continue for a further 10 minutes. Thereafter, 84.8 g of amidoamine 4 and 32 g of a 9:1 isobutanol/butylglycol mixture were added. The temperature was kept at 80° C. for a further 2 hours. The solids content was 69.5% by weight and the amine number was 142.1 mg of KOH/g.

Binder 19:

376 g of a diglycidyl ether of bisphenol A, having an epoxide equivalent weight of 188, 105 g of xylene, 44 g of nonylphenol and 6 g of dimethylbenzylamine were heated at 150°-160° C. for 6 hours. After this time, the epoxide equivalent weight was about 430. The mixture was allowed to cool to 80° C. and 34 g of methylethanolamine, 56 g of isobutanol, 56 g of toluene and 264 g of amidoamine 7 were added. The mixture was stirred for a further 4 hours at 120° C. The solids content was 70.2% by weight and the amine number was 92 mg of KOH/g.

Binder 20:

376 g of a diglycidyl ether of bisphenol A, having an epoxide equivalent weight of 188, 105 g of xylene, 44 g of nonylphenol and 6 g of dimethylbenzylamine were heated at 150°-160° C. for 6 hours. After this time, the epoxide equivalent weight was about 430. The mixture was diluted with 65 g of isobutanol and 65 g of toluene and was cooled to 60° C. 34 g of methylethanolamine were added dropwise and the mixture was stirred for 10 minutes. Thereafter, 142 g of amidoamine 4 were added and the reaction mixture was kept at 80° C. for 2 hours. The solids content was 71% by weight and the amine number was 93 mg of KOH/g.

Binder 21:

752 g of a diglycidyl ether of bisphenol A, having an epoxide equivalent weight of 188, 199 g of xylene, 44 g of nonylphenol and 6 g of dimethylbenzylamine were heated at 150°-160° C. for 6 hours. After this time, the epoxide equivalent weight was about 400. The mixture was allowed to cool to 80° C. and 68 g of methylethanolamine, 105 g of isobutanol, 105 g of toluene and 528 g of amidoamine 7 were added. The mixture was stirred for a further 4 hours at 120° C. The solids content was 69.2% by weight and the amine number was 96 mg of KOH/g.

Binder 22:

376 g of a diglycidyl ether of bisphenol A, having an epoxide equivalent weight of 188, 251 g of xylene, 103 g of an oxyethylated alkylphenol having a mean molecular weight $\overline{M}_n$ of 514 and 6 g of dimethylbenzylamine were heated at 150°-160° C. for 6 hours. After this time, the epoxide equivalent weight was about 430. The mixture was allowed to cool to 80° C. and 34 g of methylethanolamine and 264 g of amidoamine 7 were added. The mixture was stirred for a further 4 hours at 120° C. The solids content was 69.5% by weight and the amine number was 85 mg of KOH/g.

Crosslinking agents

Crosslinking agent 1:

504 g of trimerized hexamethylene diisocyanate were dissolved in 382 g of toluene. 388 g of dibutylamine were added dropwise at 70° C., while cooling. Stirring was continued until the isocyanate value was close to zero.

Crosslinking agent 2:

504 g of trimerized hexamethylene diisocyanate were dissolved in 223 g of toluene. 388 g of dibutylamine were added dropwise at 70° C., while cooling. Stirring was continued until the isocyanate value was close to zero.

Crosslinking agent 3:

152 g of bisphenol A, 63 g of a diglycidyl ether of bisphenol A, having an epoxide equivalent weight of 189, and 0.1 g of tributylphosphine were heated at 160° C. for 1 hour. After this time, epoxide was no longer detectable and a chain-extending diphenol had formed. 53.8 g of isopropanol, 129 g of di-n-butylamine, 31.5 g of paraformaldehyde and 17.6 g of isobutanol were added and the mixture was heated at 80° C. for 2 hours. The product had a solids content of 80% by weight.

Dispersions:

The amounts of binder, crosslinking agent and acetic acid stated in the Table for the preparation of the dispersions were mixed throughly. The stated amount of water was slowly added dropwise to the stirred mixture.

| Dispersion | Binder | Amount | Crosslinking agent | Amount | Acetic acid | Water |
|---|---|---|---|---|---|---|
| 1 | 1 | 852 g | 1 | 364 g | 11.6 g | 1212 g |
| 2 | 2 | 850 g | 1 | 364 g | 14.2 g | 1214 g |
| 3 | 3 | 831 g | 1 | 364 g | 15.7 g | 1234 g |
| 4 | 4 | 850 g | 1 | 364 g | 17.2 g | 1214 g |
| 5 | 5 | 849 g | 1 | 364 g | 17.0 g | 1215 g |
| 6 | 6 | 854 g | 2 | 319 g | 15.1 g | 1255 g |
| 7 | 7 | 849 g | 2 | 319 g | 16.5 g | 1260 g |
| 8 | 8 | 852 g | 2 | 319 g | 17.7 g | 1257 g |
| 9 | 9 | 856 g | 1 | 364 g | 17.8 g | 1208 g |
| 10 | 10 | 849 g | 1 | 364 g | 15.4 g | 1215 g |
| 11 | 11 | 843 g | 2 | 318 g | 14.3 g | 1267 g |
| 12 | 12 | 842 g | 2 | 318 g | 15.9 g | 1268 g |
| 13 | 13 | 854 g | 1 | 364 g | 18.4 g | 1210 g |
| 14 | 14 | 839 g | 1 | 364 g | 15.6 g | 1225 g |
| 15 | 15 | 872 g | 1 | 364 g | 28.7 g | 1193 g |
| 16 | 16 | 860 g | 1 | 364 g | 25.3 g | 1205 g |
| 17 | 17 | 860 g | 1 | 364 g | 23.7 g | 1205 g |
| 18 | 18 | 856 g | 1 | 364 g | 22.6 g | 1209 g |
| 19 | 19 | 850 g | 2 | 320 g | 19.5 g | 1200 g |
| 20 | 20 | 850 g | 3 | 320 g | 19.5 g | 1200 g |
| 21 | 21 | 850 g | 1 | 360 g | 19.5 g | 1200 g |
| 22 | 22 | 850 g | 2 | 320 g | 19.5 g | 1200 g |

Pigment paste 168.7 g of butylglycol, 600 g of water and 17.7 g of acetic acid were added to 525.8 g of a binder as described in EP 167 029, as component A1. 800 g of titanium dioxide, 11.0 g of carbon black and 50 g of basic lead silicate were then added and the mixture was milled in a ball mill to a particle size smaller than 9 μm. The solids content was brought to 48% by weight with water.

Electrocoating baths 775 g of pigment paste were added to 1,980 g of dispersion, and the mixture was stirred throughly and made up to 5,000 g with water.

The electrocoating baths were stirred for 120 hours at 28° C. Films were deposited on zinc-phosphatized steel test sheets, which had been made the cathode, at the voltage stated in the Table, in the course of 120 seconds, and were baked for 20 minutes at 170° C. The Table below shows the results.

| Dispersion | pH | C | U | FT | Erichsen | 1000 h SST |
|---|---|---|---|---|---|---|
| 1 | 6.60 | 1.26 | 400 | 35 | 7.2 | 0.9 |
| 2 | 6.80 | 1.19 | 330 | 29 | 9.8 | 0.2 |
| 3 | 6.78 | 1.85 | 340 | 32 | 10.5 | 0.3 |
| 4 | 6.59 | 1.25 | 380 | 28 | 9.7 | 0.3 |
| 5 | 6.80 | 1.67 | 380 | 37 | 9.4 | 0.2 |
| 6 | 6.87 | 1.95 | 350 | 32 | 9.6 | 0.3 |
| 7 | 7.20 | 2.07 | 370 | 32 | 9.3 | 0.3 |
| 8 | 6.80 | 1.94 | 290 | 27 | 8.9 | 0.2 |
| 9 | 6.88 | 1.82 | 310 | 27 | 8.6 | 0.4 |
| 10 | 6.92 | 1.71 | 330 | 35 | 9.5 | 0.5 |
| 11 | 6.80 | 1.80 | 280 | 32 | 7.1 | 0.6 |
| 12 | 6.55 | 1.18 | 400 | 30 | 9.6 | 0.6 |
| 13 | 7.72 | 2.40 | 200 | 30 | 8.5 | 0.3 |
| 14 | 6.34 | 0.99 | 300 | 29 | 9.2 | 0.5 |
| 15 | 6.87 | 2.42 | 260 | 26 | 8.3 | 0.3 |
| 16 | 6.83 | 2.12 | 250 | 29 | 7.8 | 0.7 |
| 17 | 6.61 | 1.90 | 290 | 26 | 7.0 | 0.5 |
| 18 | 7.20 | 1.80 | 290 | 27 | 7.1 | 0.3 |
| 19 | 7.80 | 2.54 | 250 | 32 | 8.5 | 0.2 |
| 20 | 7.60 | 2.45 | 280 | 25 | 8.7 | 0.2 |
| 21 | 7.35 | 2.32 | 280 | 28 | 8.0 | 0.2 |
| 22 | 7.50 | 2.84 | 200 | 36 | 9.5 | 0.4 | pH = pH of the bath
C = Conductivity of the bath in mS/cm
U = Deposition voltage in volt
FT = Film thickness of the coating in μm
Erichsen = Erichsen cupping in mm
1000 h SST = 1000 hours exposure in salt spray test according to DIN 50.021

We claim:

1. A coating material containing an aqueous dispersion of a binder which is water-dilutable on protonation with an acid and is obtained by reacting
   A) an epoxy compound or a mixture of epoxy compounds having an epoxide equivalent weight of less than 2,000 with
   B) 0.05 to 0.09 OH-equivalents per epoxide equivalent of a compound which is monofunctional with respect to epoxides and contains aliphatic or phenolic OH groups and
   C) 0.01 to 0.85 equivalents of a secondary amine of 2 to 36 carbon atoms, per equivalent of the epoxide groups still present in the reaction product of A and B, and
   D) 1.01 to 1.8 equivalents of amidoamine containing primary amino groups per equivalent of epoxide groups still present in the reaction product of A, B and C, the said amidoamine being obtained by reacting a primary diamine and a mono- and/or dicarboxylic acid in amounts such that the ratio of the number of equivalents of primary amine group to that of carboxyl group is about 2:1–10:1 and, as a crosslinking agent, a polyvalent blocked isocyanate, an aminoplast or phenoplast resin, a polyaminoalkylated polyphenol, a crosslinking agent which cures via ester aminolysis and/or transesterification, a urea condensate or a mixture of these crosslinking agents.

2. A coated article, obtained by applying a coating material as defined in claim 1 to this article and then carrying out baking.

* * * * *